(12) United States Patent
Sonzini et al.

(10) Patent No.: US 11,306,531 B2
(45) Date of Patent: Apr. 19, 2022

(54) TUBULAR ELECTROMECHANICAL ACTUATOR AND HOME-AUTOMATION INSTALLATION COMPRISING SUCH AN ACTUATOR

(71) Applicant: SOMFY ACTIVITES SA, Cluses (FR)

(72) Inventors: Marc Sonzini, Allinges (FR); Florian Doche, Annecy (FR); Emilie Meynet, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 117 days.

(21) Appl. No.: 16/754,294

(22) PCT Filed: Oct. 9, 2018

(86) PCT No.: PCT/EP2018/077459
§ 371 (c)(1),
(2) Date: Apr. 7, 2020

(87) PCT Pub. No.: WO2019/072835
PCT Pub. Date: Apr. 18, 2019

(65) Prior Publication Data
US 2020/0340297 A1 Oct. 29, 2020

(30) Foreign Application Priority Data

Oct. 10, 2017 (FR) .................................... 1759467

(51) Int. Cl.
*E06B 9/72* (2006.01)
*E06B 9/171* (2006.01)
(Continued)

(52) U.S. Cl.
CPC ................ *E06B 9/171* (2013.01); *E06B 9/40* (2013.01); *E06B 9/72* (2013.01); *H02K 11/33* (2016.01)

(58) Field of Classification Search
CPC .... H02K 11/33; H02K 7/116; H02K 2207/03; E06B 9/80; E06B 2009/905; E06B 9/72;
(Continued)

(56) References Cited

U.S. PATENT DOCUMENTS 3,315,728 A * 4/1967 Anderson ................. E06B 9/44
160/326
4,079,597 A * 3/1978 Lindner .................... E06B 9/72
192/142 R
(Continued)

FOREIGN PATENT DOCUMENTS

CN 101302919 A 11/2008
CN 101802341 A 8/2010
(Continued)

OTHER PUBLICATIONS

International Search Report, dated Jan. 23, 2019, from corresponding PCT application No. PCT/EP2018/077459.
(Continued)

*Primary Examiner* — Johnnie A. Shablack
(74) *Attorney, Agent, or Firm* — Nixon & Vanderhye

(57) ABSTRACT

A tubular electromechanical actuator for a home-automation installation includes at least an electronic control unit, an electric motor, a reduction gear, an output shaft, a casing and a closure element. The unit includes a housing and an electronic board. The electronic board is arranged inside the housing. The casing is hollow and configured to house at least the unit, the electric motor and the reduction gear. The closure element is configured to close off an end of the casing. The housing includes at least a first section, produced in the form of a hollow tube, and a second section, produced in the form of a hollow tube. The first and second sections are configured to house the electronic board. In addition, the
(Continued)

first section includes first fastening elements configured to cooperate with first fastening elements of the second section.

21 Claims, 7 Drawing Sheets

(51) Int. Cl.
  *H02K 11/33* (2016.01)
  *E06B 9/40* (2006.01)
(58) Field of Classification Search
  CPC ............... E06B 9/50; E06B 2009/6845; E06B 2009/725; E06B 9/171; E06B 2009/6872; E06B 9/40; E06B 9/68; B21F 11/005; B21F 3/02; B21F 35/00; F16F 1/04; G01B 11/08; G01B 11/24
  See application file for complete search history.

(56) References Cited

U.S. PATENT DOCUMENTS

| | | | | |
|---|---|---|---|---|
| 8,723,454 | B2* | 5/2014 | Skinner | E06B 9/72 318/34 |
| 9,453,370 | B2* | 9/2016 | Bohlen | E06B 9/88 |
| 10,405,684 | B2* | 9/2019 | Mullet | A47H 5/02 |
| 10,648,232 | B2* | 5/2020 | Colson | E06B 9/68 |
| 11,053,735 | B2* | 7/2021 | Sonzini | E06B 9/90 |
| 2009/0090805 | A1* | 4/2009 | Hwaung | H02P 6/24 242/390.1 |
| 2010/0282890 | A1* | 11/2010 | Ducornetz | E06B 9/174 242/404 |
| 2010/0320855 | A1* | 12/2010 | Lagarde | F16D 49/04 310/77 |
| 2011/0000696 | A1* | 1/2011 | Lau | B25F 5/02 173/217 |
| 2011/0048655 | A1 | 3/2011 | Andreasen et al. | |
| 2011/0203754 | A1* | 8/2011 | Mullet | E06B 9/72 160/405 |
| 2012/0031571 | A1 | 2/2012 | Mullet et al. | |
| 2012/0216966 | A1* | 8/2012 | Krab | E06B 9/322 160/168.1 P |
| 2015/0034259 | A1* | 2/2015 | Bohlen | E06B 9/62 160/310 |
| 2015/0075732 | A1* | 3/2015 | Kirby | F16H 1/46 160/310 |
| 2016/0380509 | A1* | 12/2016 | Crites | H02K 5/225 310/68 B |
| 2017/0241201 | A1* | 8/2017 | Buccola, Jr. | E06B 9/34 |
| 2018/0106105 | A1* | 4/2018 | Anthony | H01H 19/46 |
| 2018/0202226 | A1* | 7/2018 | Georgeault | E06B 9/32 |
| 2018/0248451 | A1* | 8/2018 | Hagiwara | G01L 5/221 |
| 2018/0259033 | A1* | 9/2018 | Basutto | E06B 9/582 |
| 2018/0283096 | A1* | 10/2018 | Nelson | E06B 9/50 |
| 2019/0032404 | A1* | 1/2019 | Chacon | H01M 10/46 |
| 2019/0100961 | A1* | 4/2019 | Kutell | E06B 9/50 |
| 2020/0099271 | A1* | 3/2020 | Lemaitre | E06B 9/72 |
| 2020/0308909 | A1* | 10/2020 | Sonzini | E06B 9/44 |
| 2020/0347672 | A1* | 11/2020 | Sonzini | E06B 9/171 |

FOREIGN PATENT DOCUMENTS

| | | | |
|---|---|---|---|
| CN | 101815841 A | | 8/2010 |
| CN | 101824959 A | | 9/2010 |
| CN | 101929303 A | | 12/2010 |
| CN | 103620152 A | | 3/2014 |
| CN | 103781985 A | | 5/2014 |
| CN | 103883244 A | | 6/2014 |
| CN | 103958810 A | | 7/2014 |
| CN | 104662249 A | | 5/2015 |
| CN | 204532012 U | | 8/2015 |
| CN | 104895478 A | | 9/2015 |
| DE | 202004012150 U1 | | 10/2004 |
| EP | 2008-N09139 | * | 11/2008 |
| FR | 2983368 A1 | | 5/2013 |
| WO | 2012/156471 A1 | | 11/2012 |
| WO | 2013/076256 A2 | | 5/2013 |

OTHER PUBLICATIONS

French Search Report, dated Jun. 7, 2018, from corresponding French application No. 1759467.

* cited by examiner

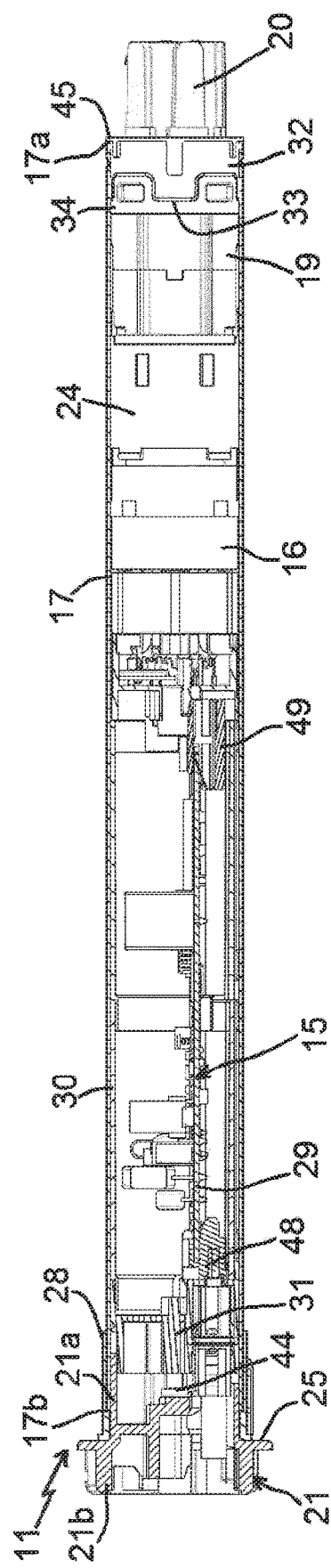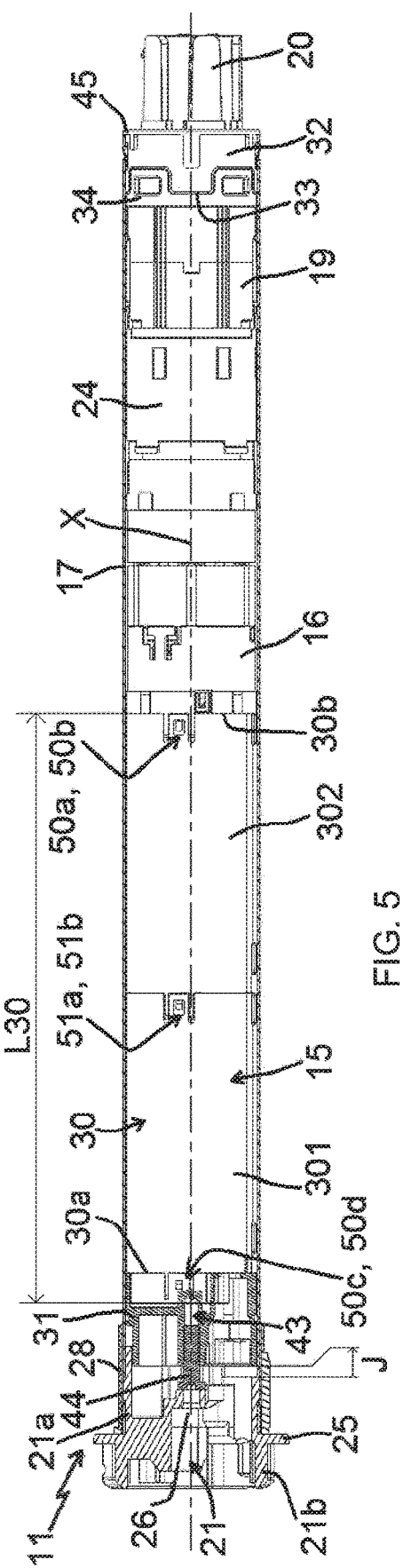
FIG. 4
FIG. 5

TUBULAR ELECTROMECHANICAL ACTUATOR AND HOME-AUTOMATION INSTALLATION COMPRISING SUCH AN ACTUATOR

BACKGROUND OF THE INVENTION

Field of the Invention

The present invention relates to a tubular electromechanical actuator and a home-automation installation for closing or sun protection comprising such an actuator.

In general, the present invention relates to the field of concealing devices comprising a motorized driving device setting a screen in motion, between at least one first position and at least one second position.

Description of the Related Art

A motorized driving device comprises an electromechanical actuator for a movable element for closing, concealing or providing solar protection such as a shutter, door, gate, blind or any other equivalent material, hereinafter referred to as a screen.

Document FR 2,983,368 A1 is already known, which describes a tubular electromechanical actuator for a closure or sun protection home-automation installation.

The electromechanical actuator comprises an electronic control unit, an electric motor, a reduction gear, an output shaft, a casing and a closure element. The electronic control unit comprises a housing and electronic board. The electronic board is arranged inside the housing, in an assembled configuration of the electronic control unit. The casing is hollow and configured to house the electronic control unit, the electric motor and the reduction gear. The closure element is configured to close off an end of the casing.

The housing of the electronic control unit comprises slugs, at a first end, that are configured to cooperate with notches arranged in the electric motor, in an assembled configuration of the electromechanical actuator.

The housing of the electronic control unit also comprises openings, at a second end opposite the first end, that are configured to cooperate with resiliently deformable tabs of the closure element, in the assembled configuration of the electromechanical actuator.

However, this electromechanical actuator has the drawback of making the housing of the electronic control unit from two half-shells configured to cooperate with one another, in the assembled configuration of the electronic control unit.

In the assembled configuration of the electromechanical actuator, the two half-shells are assembled to one another, so as to define a junction plane extending along a direction parallel to an axis of the casing of the electromechanical actuator.

As a result, such an assembly configuration of the electronic control unit requires developing a housing for each electronic board model, since the length of the housing is determined as a function of the length of the electronic board.

Furthermore, the two half-shells forming the housing of the electronic control unit comprise positioning and fastening elements of the electronic board. Such positioning and fastening elements are complex and require precise functional dimensioning of the two half-shells.

As a result, the cost of obtaining the housing of the electronic control unit is expensive.

Furthermore, the two half-shells forming the housing of the electronic control unit require manual assembly, in particular through fastening elements, particularly by resilient snapping.

SUMMARY OF THE INVENTION

The present invention aims to resolve the aforementioned drawbacks and to propose a tubular electromechanical actuator, as well as a home-automation installation for closing or sun protection comprising such actuator, making it possible to simplify the manufacture of an electronic control unit, facilitate the adaptation of the length of a housing of the electronic control unit as a function of the length of an electronic board of the electronic control unit, while minimizing the costs of obtaining the electronic control unit and eliminating manufacturing flaws of the housing of the electronic control unit.

To that end, according to a first aspect, the present invention relates to a tubular electromechanical actuator for a closure or sun protection home-automation installation, the electromechanical actuator comprising at least:
  an electronic control unit, the electronic control unit comprising a housing and an electronic board, the electronic board being arranged inside the housing, in an assembled configuration of the electronic control unit,
  an electric motor,
  a reduction gear,
  an output shaft,
  a casing, the casing being hollow and configured to house at least the electronic control unit, the electric motor and the reduction gear, and
  a closure element, the closure element being configured to close off an end of the casing.
  According to the invention,
  the housing of the electronic control unit comprises at least a first section, made in the form of a hollow tube, and a second section, made in the form of a hollow tube, the first and second sections being configured to house the electronic board, in the assembled configuration of the electronic control unit, and
  the first section of the housing comprises first fastening elements configured to cooperate with first fastening elements of the second section of the housing, in the assembled configuration of the electronic control unit.

Thus, obtaining the housing using first and second sections, made in the form of a hollow tube, makes it possible to adapt the length of the housing as a function of the length of the electronic board, using at least one of the first and second sections, while eliminating manufacturing flaws, in particular in the case where the housing is made using a single section, made in the form of a hollow tube.

Furthermore, obtaining the housing using first and second sections, made in the form of a hollow tube, makes it possible to guarantee the protection of the electronic board, during the assembly of the electronic control unit to the inside of the casing of the electromechanical actuator, in particular to avoid a deformation of the electronic board.

According to one advantageous feature of the invention, the first fastening elements of the first and second sections of the housing are fastening elements by resilient snapping.

According to another advantageous feature of the invention, the first section of the housing comprises second fastening elements configured to cooperate with the first fastening elements of the electric motor, in an assembled configuration of the electromechanical actuator.

According to another advantageous feature of the invention, the electric motor comprises an electric connector configured to cooperate with the electronic board of the electronic control unit, in the assembled configuration of the electromechanical actuator.

According to another advantageous feature of the invention, the electromechanical actuator also comprises an interface element. The interface element is arranged between the closure element and the electronic control unit. Furthermore, the second section of the housing comprises second fastening elements configured to cooperate with first fastening elements of the interface element, in the assembled configuration of the electromechanical actuator.

According to one advantageous feature of the invention, the first and second sections of the housing respectively comprise the same first and second fastening elements.

According to another advantageous feature of the invention, the interface element comprises an electric connector configured to cooperate with the electronic board of the electronic control unit.

According to another advantageous feature of the invention, the first and second sections of the housing are made from a plastic material. Furthermore, the first and second sections of the housing are obtained using a technique for injecting plastic material.

According to another advantageous feature of the invention, each of the first and second sections of the housing comprises a first groove and a second groove that are configured to keep the electronic board in position inside the housing, in the assembled configuration of the electronic control unit.

According to a second aspect, the invention relates to a home-automation installation for closing or sun protection that comprises a screen able to be wound on a winding tube rotated by a tubular electromechanical actuator according to the invention.

This home-automation installation has features and advantages similar to those previously described relative to the tubular electromechanical actuator described above.

BRIEF DESCRIPTION OF THE DRAWINGS

Other particularities and advantages of the invention will also appear in the description below, done in reference to the appended drawings, provided as non-limiting examples:

FIG. 4 is a sectional schematic view of the electromechanical actuator illustrated in FIG. 3, in an offset section plane relative to a longitudinal axis of the actuator;

FIG. 5 is a partial sectional schematic view of the electromechanical actuator illustrated in FIG. 3, in a section plane passing through the longitudinal axis of the actuator;

DESCRIPTION OF THE PREFERRED EMBODIMENTS

Figure 1:
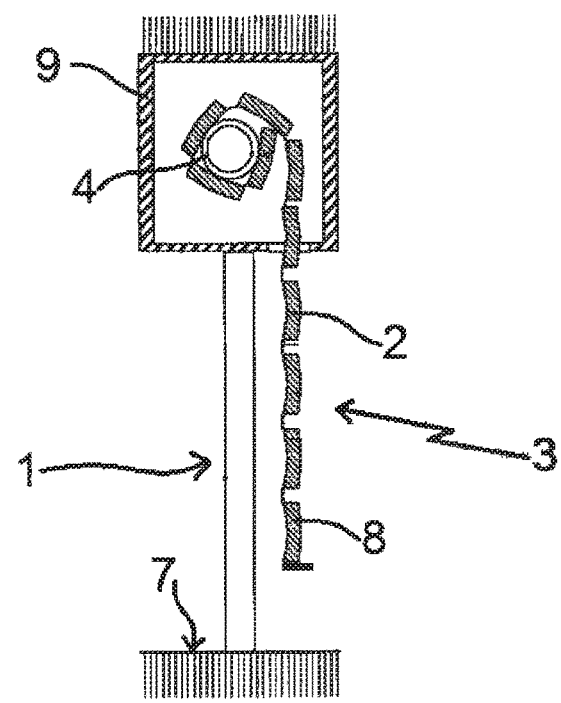
FIG. 1 is a cross-sectional schematic view of a home-automation installation according to one embodiment of the invention.
Figure 2:
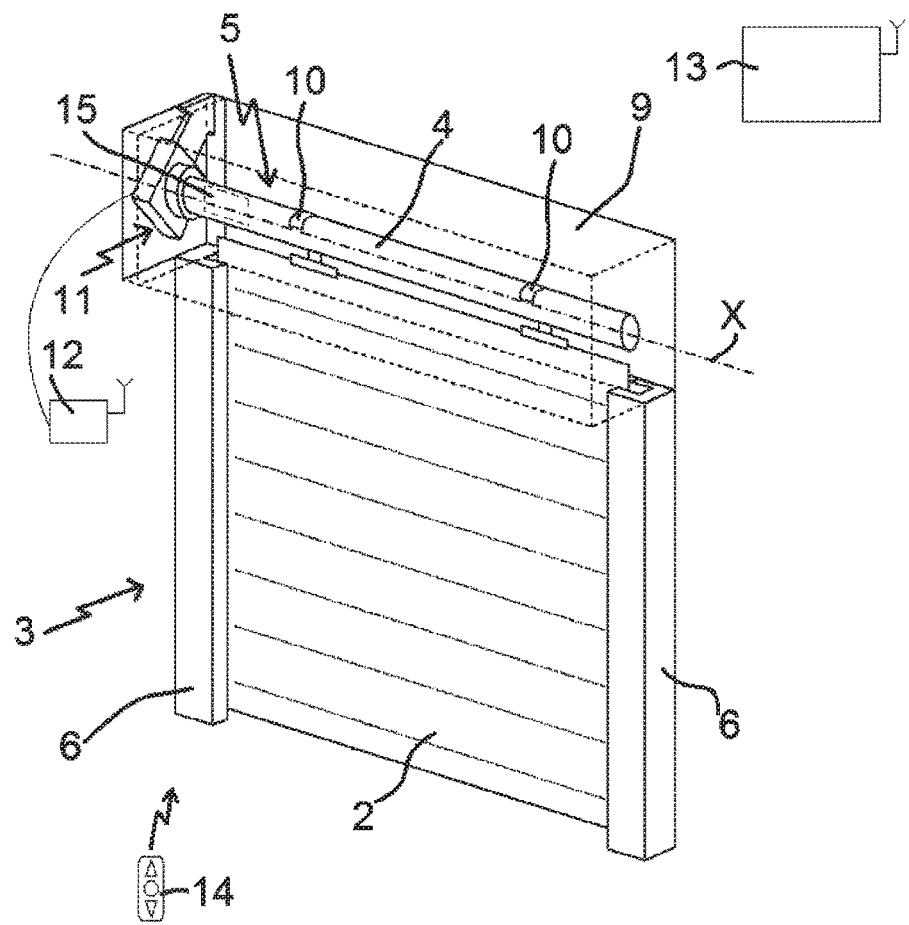
FIG. 2 is a perspective schematic view of the home-automation installation illustrated in FIG. 1.

In reference to FIGS. 1 and 2, we first describe a home-automation installation according to the invention and installed in a building comprising an opening 1, window or door, equipped with a screen 2 belonging to a concealing device 3, in particular a motorized rolling shutter.

The concealing device 3 can be a rolling shutter, a canvas blind or a blind with adjustable slats, or a rolling gate. The present invention applies to all types of concealing devices.

A rolling shutter according to one embodiment of the invention is described in reference to FIGS. 1 and 2.

The screen 2 of the concealing device 3 is wound on a winding tube 4 driven by a motorized driving device 5 and movable between a wound position, in particular an upper position, and an unwound position, in particular a lower position.

The moving screen 2 of the concealing device 3 is a closure, concealing and/or sun protection screen, winding on the winding tube 4, the inner diameter of which is generally greater than the outer diameter of an electromechanical actuator 11, such that the electromechanical actuator 11 can be inserted into the winding tube 4, during the assembly of the concealing device 3.

The motorized driving device 5 comprises the electromechanical actuator 11, in particular of the tubular type, making it possible to set the winding tube 4 in rotation, so as to unwind or wind the screen 2 of the concealing device 3.

The concealing device 3 comprises the winding tube 4 for winding the screen 2. In the mounted state, the electromechanical actuator 11 is inserted into the winding tube 4.

In a known manner, the rolling shutter, which forms the concealing device 3, comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final end slat 8, for example L-shaped, of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the apron 2 of the rolling shutter 3, opposite the final end slat 8, is connected to the winding tube 4 using at least one articulation 10, in particular a fastener in strip form.

The winding tube 4 is positioned inside the box 9 of the rolling shutter 3. The apron 2 of the rolling shutter 3 winds and unwinds around the winding tube 4 and is housed at least partially inside the box 9.

In general, the box 9 is positioned above the opening 1, or in the upper part of the opening 1.

The motorized driving device 5 is controlled by a control unit. The control unit may for example be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured, for example, to determine a temperature, a brightness, or a wind speed.

A remote control 14, which can be a type of local control unit, and provided with a control keypad, which comprises selection and display elements, further allows a user to intervene on the electromechanical actuator 11 and/or the central control unit 13.

The motorized driving device 5 is, preferably, configured to carry out the unwinding or winding commands of the screen 2 of the concealing device 3, which may, in particular, be acquired by the remote control 14.

The electromechanical actuator 11 belonging to the home-automation installation of FIGS. 1 and 2 is now described in reference to FIGS. 3 to 11.

The electromechanical actuator 11 comprises an electronic control unit 15, an electric motor 16, a reduction gear 19 and an output shaft 20.

Figure 3:
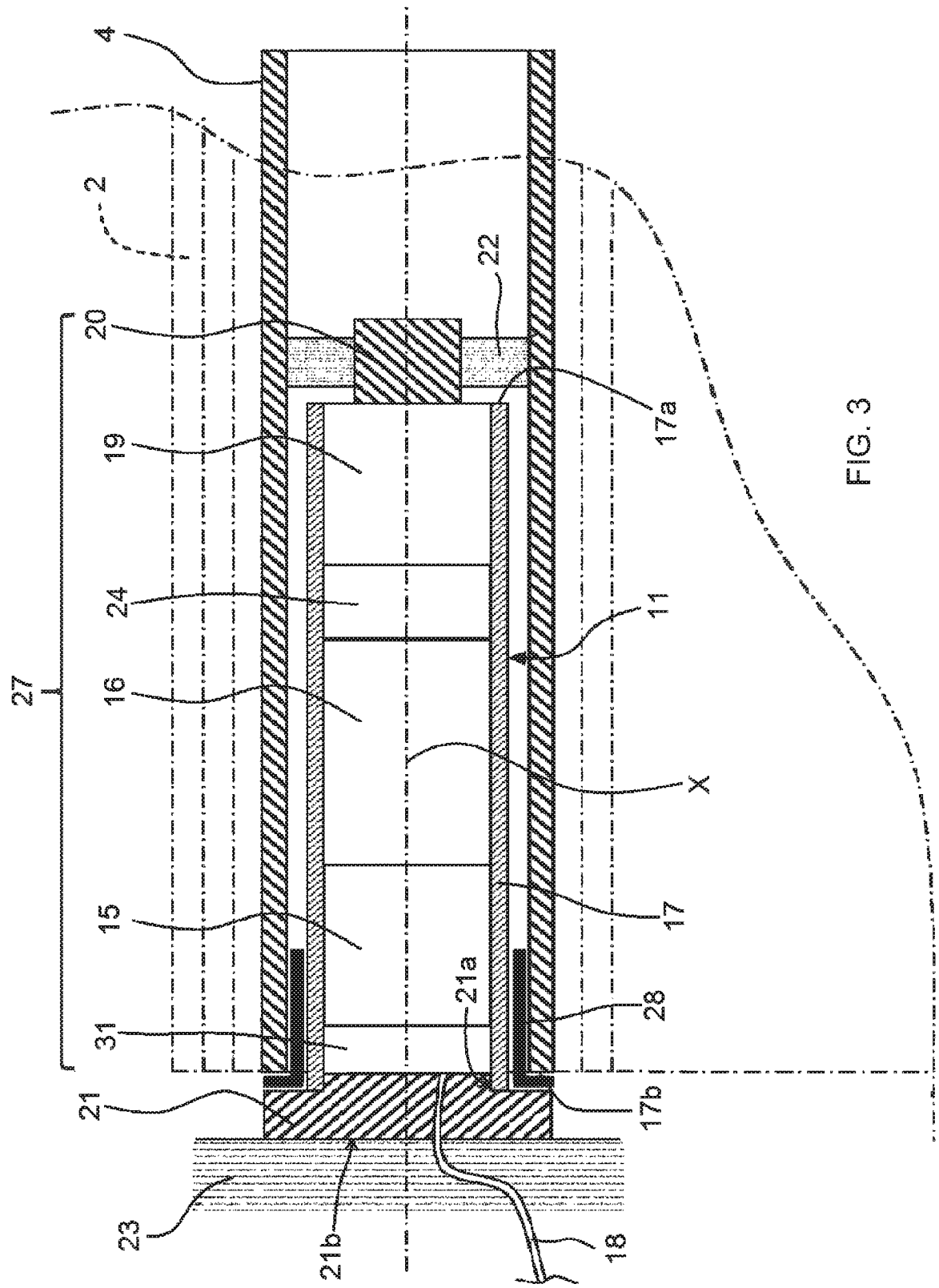
FIG. 3 is a partial and axial sectional schematic view of the home-automation installation illustrated in FIGS. 1 and 2, showing a tubular electromechanical actuator of the installation.
Figure 11:
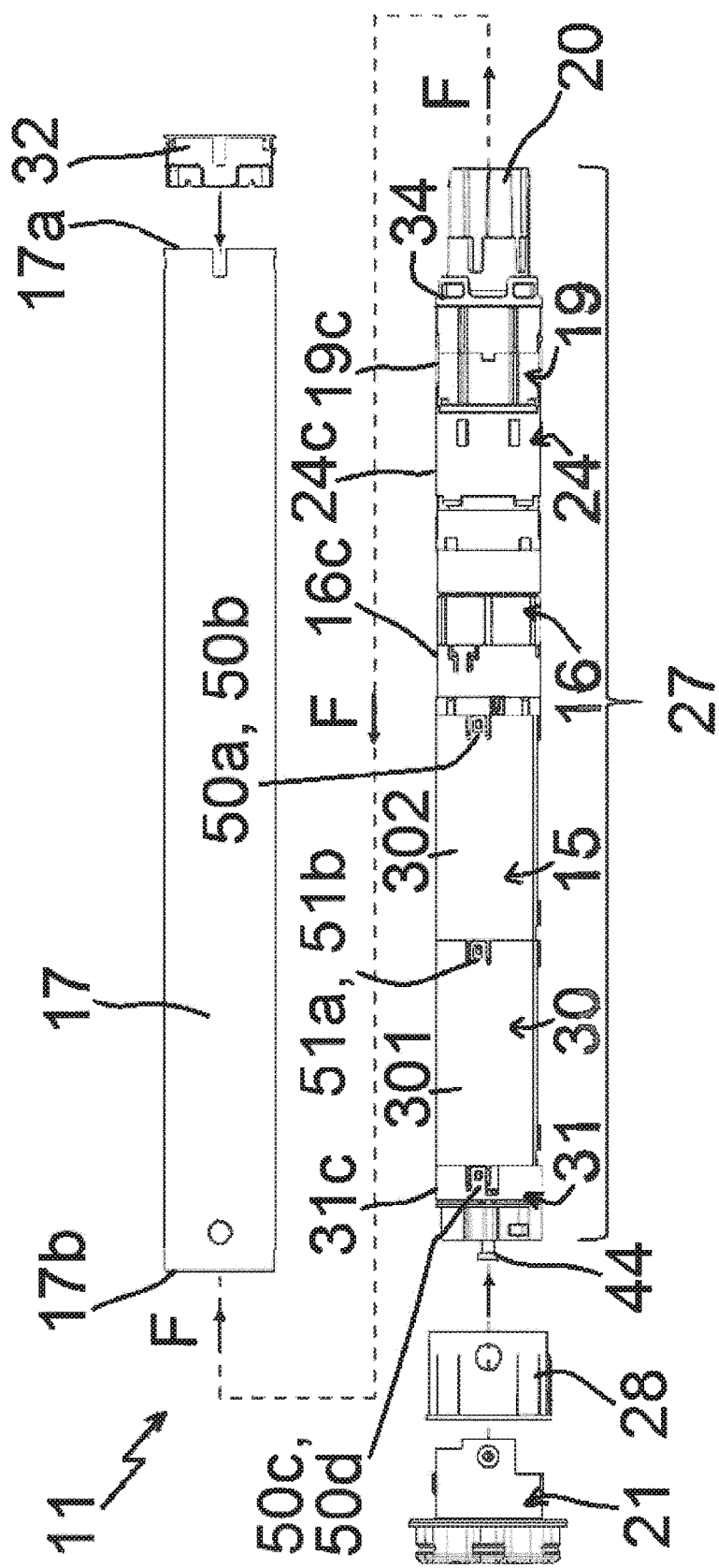
FIG. 11 is a schematic view of the electromechanical actuator illustrated in FIGS. 4 and 5, representative of an assembly method of this actuator.

Here, the electronic control unit 15, the electric motor 16, the reduction gear 19 and the output shaft 20 form an assembly 27, as illustrated in FIGS. 3 and 11.

Thus, the assembly 27 is formed by members of the electromechanical actuator 11, of which the electronic control unit 15, the electric motor 16, the reduction gear 19 and the output shaft 20 are an integral part.

The electric motor 16 comprises a rotor and a stator, not shown, which are positioned coaxially around a rotation axis X, which is also the rotation axis of the winding tube 4 in the assembled configuration of the motorized driving device 5.

Here, the reduction gear 19 is of the type with gear pairs.

In practice, the electric motor 16 comprises an output shaft, not shown, configured to cooperate with an input shaft, not shown, of the reduction gear 19, in an assembled configuration of the electromechanical actuator 11.

Control means for controlling the electromechanical actuator 11, making it possible to move the screen 2 of the concealing device 3, comprise at least the electronic control unit 15. This electronic control unit 15 is able to operate the electric motor 16 of the electromechanical actuator 11 and, in particular, to allow the supply of electricity for the electric motor 16.

Thus, the electronic control unit 15, in particular, controls the electric motor 16, so as to open or close the screen 2, as previously described.

The electronic control unit 15 also comprises an order receiving module, in particular for wireless orders sent by an order transmitter, such as the remote control 14 designed to control the electromechanical actuator 11 or one of the local 12 or central 13 control units.

The order receiving module can also allow the reception of orders sent by wired means.

The control means of the electromechanical actuator 11 comprise hardware and/or software means.

As a non-limiting example, the hardware means may comprise at least one microcontroller.

The electromechanical actuator 11 also comprises a casing 17, which is, in particular, tubular.

The casing 17 of the electromechanical actuator 11 is, preferably, in cylindrical shape and, more specifically, has a circular section.

In one embodiment, the casing 17 is made from an electrically conductive material, in particular metallic.

The material of the casing of the electromechanical actuator is not limiting and may be different. It can, in particular, be a plastic.

The casing 17 is hollow and configured to house the electronic control unit 15, the electric motor 16 and the reduction gear 19. Furthermore, the casing 17 can, optionally, be configured to house part of the output shaft 20.

The casing 17 comprises a first end 17a and a second end 17b. The second end 17b is opposite the first end 17a.

The output shaft 20 of the electromechanical actuator 11 protrudes past the casing 17 at the first end 17a of the casing 17, in the assembled configuration of the electromechanical actuator 11.

Thus, the output shaft 20 of the electromechanical actuator 11 is positioned inside the winding tube 4 and at least partially outside the casing 17 of the electromechanical actuator 11.

Advantageously, the output shaft 20 of the electromechanical actuator 11 is coupled, by a connecting element 22, to the winding tube 4, in particular using a wheel-shaped connecting element.

The electromechanical actuator 11 is supplied with electricity by an electricity grid of the sector, or using a battery, which can, for example, be recharged by a photovoltaic panel. The electromechanical actuator 11 makes it possible to move the screen 2 of the concealing device 3.

Here, the electromechanical actuator 11 comprises an electrical power cable 18 allowing it to be supplied with electricity from the electricity grid of the sector.

Advantageously, the electromechanical actuator 11 also comprises a brake 24.

Here, the brake 24 of the electromechanical actuator 11 is an integral part of the assembly 27.

As a non-limiting example, the brake 24 may be a spring-loaded brake, a cam brake or an electromagnetic brake.

Advantageously, the electromechanical actuator 11 may also comprise an end-of-travel and/or obstacle detection device, which may be mechanical or electronic.

The electromechanical actuator 11 also comprises a closure element 21 for the second end 17b of the casing 17.

The closure element 21 protrudes past the casing 17 at the second end 17b of the casing 17, in the assembled configuration of the electromechanical actuator 11.

In practice, the closure element 21 is positioned at one end of the electromechanical actuator 11 opposite that at which the output shaft 20 protrudes from the casing 17.

Here, the casing 17 of the electromechanical actuator 11 is fastened to a support 23, in particular a flange, of the box 9 of the concealing device 3 using the closure element 21 forming a torque pin, in particular a closure and torque-reacting head. In such a case where the closure element 21 forms a torque pin, the closure element 21 is also called a fixed point of the electromechanical actuator 11.

Advantageously, the closure element 21 is made from plastic and, more specifically, by molding.

In the exemplary embodiment illustrated in FIGS. 3 to 6 and 10 to 11, the closure element 21 is made in a single piece, in particular of the monobloc type.

Here, the closure element 21 is a revolving part.

The closure element 21 comprises a first part 21a configured to cooperate with the casing 17 of the electromechanical actuator 11 and a second part 21b configured to cooperate with the support 23.

At least the first part 21a of the closure element 21 is generally in cylindrical shape and is arranged inside the casing 17 of the electromechanical actuator 11, in the assembled configuration of the electromechanical actuator 11.

Advantageously, the closure element 21 comprises a stop 25 configured to cooperate with the casing 17, at the second end 17b of the casing 17, in the assembled configuration of the electromechanical actuator 11, in particular via a crown 28.

Thus, the stop 25 of the closure element 21 makes it possible to limit the pushing in of the first part 21a of the closure element 21 in the casing 17.

Furthermore, the stop 25 of the closure element 21 delimits the first and second parts 21a, 21b of the closure element 21.

Thus, only the first part 21a of the closure element 21 is arranged inside the casing 17 of the electromechanical actuator 11, following the fitting of the closure element 21 inside the casing 17, up to the stop 25.

Here, the stop 25 of the closure element 21 is made in the form of a flange ring, in particular with a cylindrical and planar shape.

In a variant, not shown, the closure element 21 comprises at least two parts. The first part of the closure element 21 comprises the first part 21a of the closure element 21 configured to cooperate with the casing 17 of the electromechanical actuator 11. The second part of the closure element 21 comprises the second part 21b of the closure element 21 configured to cooperate with the support 23.

Advantageously, the electromechanical actuator 11 comprises the crown 28. The crown 28 is arranged around the casing 17 of the electromechanical actuator 11 and at the second end 17b of the casing 17.

Here, the winding tube 4 is rotated about the rotation axis X and the casing 17 of the electromechanical actuator 11 supported by two pivot links. The first pivot link is produced at a first end of the winding tube 4 using the crown 28. The crown 28 thus makes it possible to produce a bearing. The second pivot link, not shown, is produced at a second end of the winding tube 4.

The electromechanical actuator 11 also comprises an interface element 31, as illustrated in FIGS. 4 to 7, 10 and 11. The interface element 31 is arranged between the closure element 21 and, more specifically, the first part 21a of the closure element 21, and the electronic control unit 15, along the direction of the rotation axis X.

Here, the interface element 31 of the electromechanical actuator 11 is an integral part of the assembly 27.

Here, and as illustrated in FIGS. 4 and 5, the electronic control unit 15, the electric motor 16, the reduction gear 19, the interface element 31 and the brake 24 are positioned inside the casing 17 of the electromechanical actuator 11.

Preferably, the members 31, 15, 16, 19, 24, 20 of the assembly 27 are assembled to one another in a predetermined order. The predetermined assembly order of the members 31, 15, 16, 19, 24, 20 of the assembly 27 first comprises the assembly of the interface element 31 with the electronic control unit 15, then the assembly of the electronic control unit 15 with the electric motor 16, then the assembly of the electric motor 16 with the reduction gear 19 and the assembly of the reduction gear 19 with the output shaft 20.

In the exemplary embodiment illustrated in FIGS. 3 to 5 and 11, the brake 24 is positioned between the electric motor 16 and the reduction gear 19.

In a variant, not shown, the brake 24 is positioned between the reduction gear 19 and the output shaft 20.

Here, each member 31, 15, 16, 19, 24, 20 of the assembly 27 has an axis that is combined with the rotation axis X, in the assembled configuration of the electromechanical actuator 11. The axis of each of the members 15, 16, 19, 24, 20 of the assembly 27 is not shown in FIGS. 3 to 11, so as to simplify the reading thereof.

Figure 7:
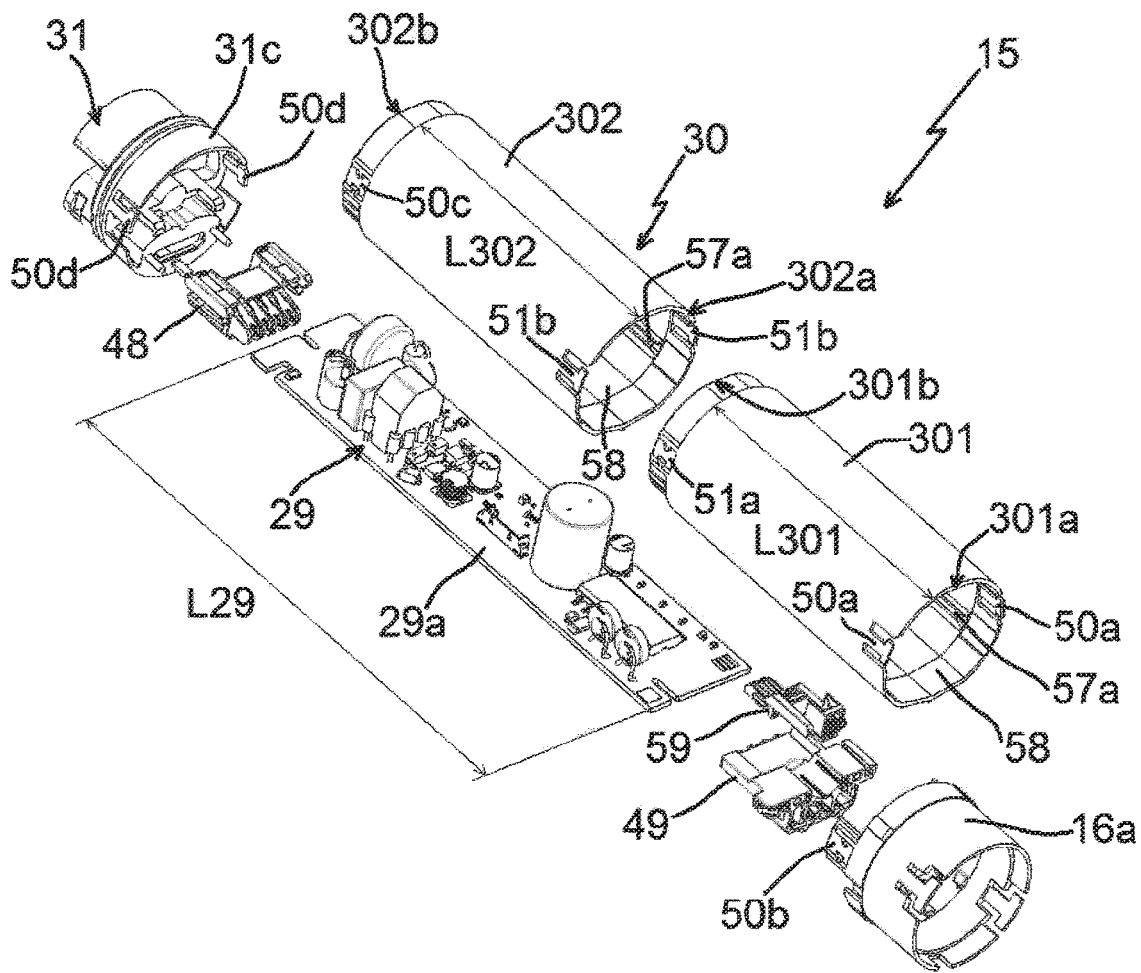
FIG. 7 is an exploded and perspective schematic view of part of the electromechanical actuator illustrated in FIGS. 4 and 5, showing an electronic control unit, the interface element and a cover of an electric motor.
Figure 8:
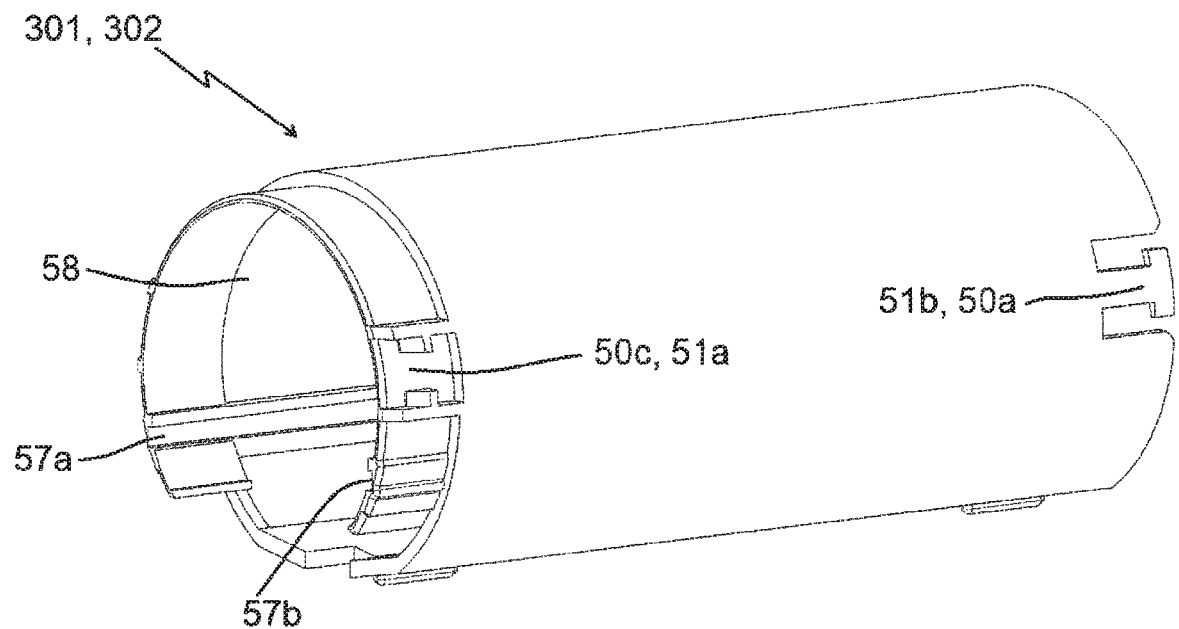
FIG. 8 is a perspective schematic view of a section of a housing of the electronic control unit illustrated in FIG. 7.

The electronic control unit 15 belonging to the electromechanical actuator 11 of FIGS. 3 to 5 is now described in more detail in reference to FIGS. 7 and 8.

The electronic control unit 15 comprises a housing 30 and an electronic board 29. The electronic board 29 is positioned inside the housing 30, in the assembled configuration of the electronic control unit 15.

Thus, the housing 30 of the electronic control unit 15 makes it possible to protect the electronic board 29, during the assembly of the electromechanical actuator 11 and following the assembly of the latter, as well as to ensure the rigidity of the assembly 27.

Furthermore, the housing 30 of the electronic control unit 15 makes it possible to electrically insulate the electronic board 29 relative to the casing 17.

Preferably, the outer diameter of the housing 30 of the electronic control unit 15 is smaller than the inner diameter of the casing 17 of the electromechanical actuator 11, such that the housing 30 can be inserted into the casing 17 of the electromechanical actuator 11, during the assembly of the electromechanical actuator 11.

The housing 30 of the electronic control unit 15 comprises a first section 301, made in the form of a first hollow tube, and a second section 302, made in the form of a second hollow tube.

The first and second sections 301, 302 are configured to house the electronic board 29, in an assembled configuration of the electronic control unit 15.

Furthermore, the first section 301 of the housing 30 comprises first fastening elements 51a configured to cooperate with first fastening elements 51b of the second section 302 of the housing 30, in the assembled configuration of the electronic control unit 15.

Thus, obtaining the housing 30 using first and second sections 301, 302, made in the form of a hollow tube, makes it possible to adapt the length L30 of the housing 30 as a function of the length L29 of the electronic board 29 using at least one of the first and second sections 301, 302, while eliminating manufacturing flaws. The lengths L29, L30 are measured parallel to the rotation axis X, in the assembled configuration of the electromechanical actuator 11.

Furthermore, obtaining the housing 30 using first and second sections 301, 302, made in the form of a hollow tube, makes it possible to guarantee the protection of the electronic board 29, during the assembly of the electronic control unit 15 to the inside of the casing 17 of the electromechanical actuator 11, in particular to avoid a deformation of the electronic board 29.

Furthermore, the first fastening elements 51*a*, 51*b* of the first and second sections 301, 302 of the housing 30 make it possible to secure these first and second sections 301, 302 to one another in rotation and in translation.

Furthermore, the assembly of the first and second sections 301, 302 of the housing 30 of the electronic control unit 15 using first fastening elements 51*a*, 51*b* can be implemented automatically.

As a result, the cost of obtaining the housing 30 of the electronic control unit 15 is less expensive than a housing of an electronic control unit comprising two half-shells for which a manual assembly is necessary, like that disclosed in document FR 2,983,368 A1.

Preferably, the first fastening elements 51*a*, 51*b* of the first and second sections 301, 302 of the housing 30 are fastening elements by resilient snapping.

Here, the first fastening elements 51*a*, 51*b* by resilient snapping of the first and second sections 301, 302 of the housing 30 are made using tongues and slugs.

In reference to FIGS. 5 and 11, each tongue comprises an opening configured to cooperate with a slug.

In a variant and as shown in FIGS. 7 and 8, each tongue 51*b* is configured to cooperate with two slugs of a complementary fastening element 51*a*. Advantageously, the tongue 51*b* has a "T" shape. In other words, the tongue 51*b* comprises a first branch and a second branch that are coupled to one another. The second branch is positioned on either side of the first branch. Here, the second branch is perpendicular to the first branch. Furthermore, each slug is configured to be housed at a distinct angle formed by the first branch and the second branch of the tongue.

Each of the first and second sections 301, 302 of the housing 30 is, preferably, in cylindrical shape and, more specifically, has a circular section.

Here, the first section 301 of the housing 30 comprises a first end 301*a* configured to cooperate with the electric motor 16 and, in particular, a cover 16*a* of the electric motor 16. The first section 301 of the housing 30 also comprises a second end 301*b*, opposite the first end 301*a*, configured to cooperate with a first end 302*a* of the second section 302 of the housing 30. Furthermore, the second section 302 of the housing 30 comprises a second end 302*b*, opposite the first end 302*a*, configured to cooperate with the interface element 31.

Advantageously, the first section 301 of the housing 30 comprises second fastening elements 50*a* configured to cooperate with first fastening elements 50*b* of the electric motor 16, in the assembled configuration of the electromechanical actuator 11. Furthermore, the second section 302 of the housing 30 comprises second fastening elements 50*c* configured to cooperate with first fastening elements 50*d* of the interface element 31, in the assembled configuration of the electromechanical actuator 11.

Thus, the first and second sections 301, 302 of the housing 30 are assembled with the electric motor 16 and the interface element 31, in particular before the introduction of these elements 30, 16, 31 and, more specifically, of the assembly 27 inside the casing 17, so as to facilitate the handling and assembly operations of the electromechanical actuator 11.

Preferably, the second fastening elements 50*a*, 50*c* of the first and second sections 301, 302 of the housing 30 and the first fastening elements 50*b*, 50*d* of the electric motor 16 and of the interface element 31 are fastening elements by resilient snapping.

Here, the second fastening elements 50*a*, 50*c* of the first and second sections 301, 302 of the housing 30 and the first fastening elements 50*b*, 50*d* of the electric motor 16 and of the interface element 31 by resilient snapping are produced using tongues and slugs.

In reference to FIGS. 5 and 11, each tongue 50*a*, 50*d* comprises an opening configured to cooperate with a slug.

In a variant and as shown in FIGS. 7 and 8, each tongue 50*a*, 50*d* is configured to cooperate with two slugs. Advantageously, the tongue 50*a*, 50*d* has a "T" shape. In other words, the tongue 50*a*, 50*d* comprises a first branch and a second branch that are coupled to one another. The second branch is positioned on either side of the first branch. Here, the second branch is perpendicular to the first branch. Furthermore, each slug is configured to be housed at a distinct angle formed by the first branch and the second branch of the tongue.

Preferably, the first and second sections 301, 302 of the housing 30 are made from a plastic material. Furthermore, the first and second sections 301, 302 of the housing 30 are obtained using a technique for injecting plastic material.

Thus, the manufacturing of the first and second sections 301, 302 of the housing 30, according to a technique for injecting plastic material, makes it possible to guarantee a high level of compliance of the first and second sections 301, 302 and to reduce the tolerance intervals of the dimensions associated with the first and second sections 301, 302, so as to improve the precision of the assembly of the electronic control unit 15, as well as the electromechanical actuator 11.

Furthermore, the manufacturing of the first and second sections 301, 302 of the housing 30, using a technique for injecting plastic material, makes it possible to incorporate the first and second fastening elements 50*a*, 51*a*, 51*b*, 50*c* to the first and second sections 301, 302.

Preferably, the first and second sections 301, 302 of the housing 30 respectively comprise the same first and second fastening elements 50*a*, 51*a*, 51*b*, 50*c*.

Thus, the first and second sections 301, 302 of the housing 30 are modular elements and can be inverted.

In this way, the first and second fastening elements 50*a*, 51*a*, 51*b*, 50*c* of each of the first and second sections 301, 302 of the housing 30 are identical.

Furthermore, at least one of the first and second sections 301, 302 of the housing 30 can be added or removed, during the assembly of the electronic control unit 15, so as to adapt the length L30 of the housing 30 of the electronic control unit 15 as a function of the length L29 of the electronic board 29.

Here, the first and second sections 301, 302 of the housing 30 are identical and have identical lengths L301, L302.

Thus, such a housing 30 made using identical first and second sections 301, 302 makes it possible to reduce the costs of obtaining the electronic control unit 15 and to simplify the industrialization of the electromechanical actuator 11.

In a variant, not shown, the first and second sections 301, 302 of the housing 30 have different lengths L301, L302.

Preferably, each of the first and second sections 301, 302 of the housing 30 comprises a first groove 57*a* and a second groove 57*b* that are configured to keep the electronic board 29 in position inside the housing 30, in the assembled configuration of the electronic control unit 15.

In this way, during the assembly of the electronic control unit 15 and, in particular, following the assembly of the first and second sections 301, 302 of the housing 30, the electronic board 29 is inserted inside the housing 30 by sliding. The sliding of the electronic board 29 inside the housing 30 is carried out by guiding a printed circuit board 29*a* of the electronic board 29 inside the first and second grooves 57*a*, 57*b* of each of the first and second sections 301, 302 of the housing 30.

The first and second sections 301, 302, which are respectively made in the form of a hollow tube, forming the housing 30 of the electronic control unit 15, thus comprise elements 57*a*, 57*b* for positioning and retaining the electronic board 29 that are simple and do not require precise functional dimensioning.

As a result, the cost of obtaining the housing 30 of the electronic control unit 15 is less expensive than a housing of an electronic control unit comprising two half-shells, like that disclosed in document FR 2,983,368 A1.

Furthermore, the first and second sections 301, 302 make it possible to produce a spacer by means of the first and second grooves 57*a*, 57*b*, so as to electrically insulate the electronic board 29 relative to the casing 17 of the electromechanical actuator 11.

In practice, the first and second grooves 57*a*, 57*b* are respectively arranged at an inner surface 58 of each of the first and second sections 301, 302 of the housing 30.

Advantageously, the first groove 57*a* is diametrically opposite the second groove 57*b*, for each of the first and second sections 301, 302 of the housing 30.

Preferably, in an assembled configuration of the first and second sections 301, 302 of the housing 30, the first groove 57*a* of the first section 301 is aligned with the first groove 57*a* of the second section 302. Furthermore, the second groove 57*b* of the first section 301 is aligned with the second groove 57*b* of the second section 302.

Advantageously, the electric motor 16 comprises an electric connector 49 configured to cooperate with the electronic board 29 of the electronic control unit 15, in the assembled configuration of the electromechanical actuator 11.

Furthermore, the interface element 31 comprises a first electric connector 48 configured to cooperate with the electronic board 29 of the electronic control unit 15, in the assembled configuration of the electromechanical actuator 11.

Here, the electrical connector 49 of the electric motor 16 and the first electrical connector 48 of the interface element 31 are electrical connectors configured, on the one hand, to plug onto an edge of the printed circuit board 29*a* of the electronic board 29, and, on the other hand, to cooperate with electric tracks of the electronic board 29.

Furthermore, the assembly of the electronic control unit 15 with the electric motor 16 and the interface element 31 using fastening elements 50*a*, 50*b*, 50*c*, 50*d* and the assembly of the electrical connectors 48, 49 on the printed circuit board 29*a* of the electronic board 29 make it possible to form an electrical connection of the electronic board 29 toward the electric motor 16 using the electrical connector 49 and to form an electrical connection of the electronic board 29 toward the interface element 31 using the first electrical connector 48 without electrical cables.

In this way, these electrical connections are implemented only using electrical connectors 48, 49 plugged onto an edge of the printed circuit board 29*a* of the electronic board 29.

Advantageously, the electric motor 16 comprises an additional electronic board, not shown, and, in particular, positioned inside the cover 16*a* of the electric motor 16. Furthermore, the electric motor 16 comprises an additional electrical connector 59 configured to cooperate, on the one hand, with the electronic board 29 of the electronic control unit 15 and, on the other hand, with the additional electronic board of the electric motor 16, in the assembled configuration of the electromechanical actuator 11.

Furthermore, the assembly of the electronic control unit 15 with the electric motor 16 using fastening elements 50*a*, 50*b* and the assembly of the additional electrical connector 59 with the printed circuit board 29*a* of the electronic board 29 makes it possible to form an electrical connection of the electronic board 29 of the electronic control unit 15 toward the additional electronic board of the electric motor 16 using the additional electrical connector 59 without electrical cables.

In this way, this electrical connection is implemented only using the additional electrical connector 59 plugged onto an edge of the printed circuit board 29*a* of the electronic board 29 and electrically coupled to the additional electronic board of the electric motor 16.

In the exemplary embodiment illustrated in FIG. 7, the additional electrical connector 59 of the electric motor 16 is configured to be fastened on the electrical connector 49 of the electric motor 16 using fastening elements, in the assembled configuration of the electromechanical actuator 11.

Here, the fastening elements of the additional electrical connector 59 with the electrical connector 49 are pluggable fastening elements, in particular a rib configured to slide inside a groove.

Advantageously, the additional electronic board of the electric motor 16 makes it possible to check the position of the rotor of the electric motor 16. Such a determination of the position of the rotor of the electric motor 16 can be carried out either using sensors that can, for example, be Hall effect sensors positioned on the additional electronic board, or using a device for determining a physical property, in particular the electric current passing through the electric motor 16 during its operation.

Advantageously, the additional electronic board of the electric motor 16 is positioned perpendicular to the electronic board 29 of the electronic control unit 15, in the assembled configuration of the electromechanical actuator 11.

Thus, the additional electronic board of the electric motor 16 extends along a plane perpendicular to a plane passing through the electronic board 29 of the electronic control unit 15, in the assembled configuration of the electromechanical actuator 11.

The various members of the electromechanical actuator 11 belonging to the home-automation installation of FIGS. 1 and 2 are now described in reference to FIGS. 3 to 11.

Advantageously, the electric motor 16 has a body 16*c*, as illustrated in FIG. 11. Furthermore, the body 16*c* of the electric motor 16 is, preferably, in cylindrical shape and, more specifically, has a circular section.

Preferably, the outer diameter of the body 16*c* of the electric motor 16 is smaller than the inner diameter of the casing 17 of the electromechanical actuator 11, such that the body 16*c* of the electric motor 16 can be inserted into the casing 17 of the electromechanical actuator 11, during the assembly of the electromechanical actuator 11.

Advantageously, the reduction gear 19 has a body 19*c*, as illustrated in FIG. 11. Furthermore, the body 19*c* of the reduction gear 19 is, preferably, in cylindrical shape and, more specifically, has a circular section.

Preferably, the outer diameter of the body 19*c* of the reduction gear 19 is smaller than the inner diameter of the casing 17 of the electromechanical actuator 11, such that the body 19*c* of the reduction gear 19 can be inserted into the casing 17 of the electromechanical actuator 11, during the assembly of the electromechanical actuator 11.

Figure 6:
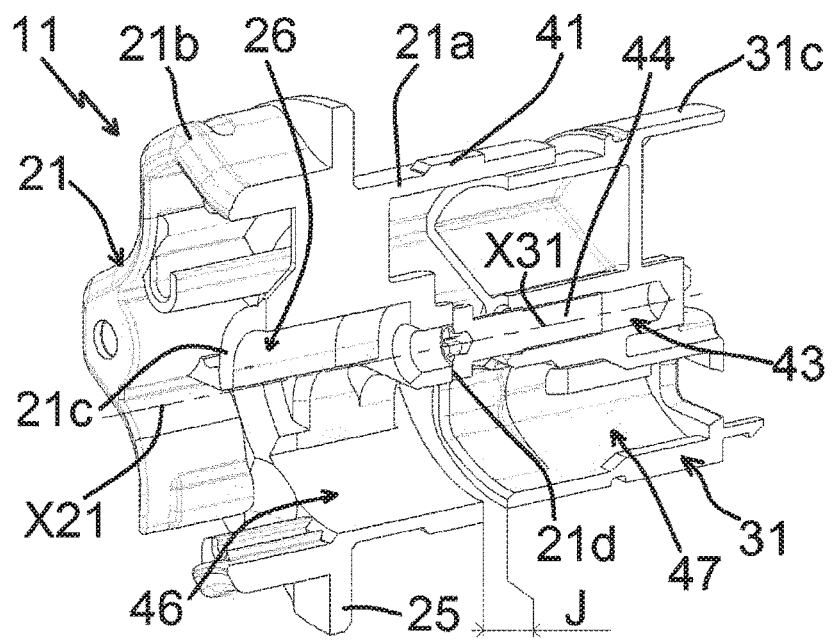
FIG. 6 is a sectional and perspective schematic view of part of the electromechanical actuator illustrated in FIGS. 4 and 5, showing a closure element, an interface element and an inhibiting element.

Advantageously, the interface element 31 has a body 31c, as illustrated in FIGS. 6 and 11. Furthermore, the body 31c of the interface element 31 is, preferably, in cylindrical shape and, more specifically, has a circular section.

Preferably, the outer diameter of the body 31c of the interface element 31 is smaller than the inner diameter of the casing 17 of the electromechanical actuator 11, such that the body 31c of the interface element 31 can be inserted into the casing 17 of the electromechanical actuator 11, during the assembly of the electromechanical actuator 11.

Advantageously, the brake 24 has a body 24c, as illustrated in FIG. 11. Furthermore, the body 24c of the brake 24 is, preferably, in cylindrical shape and, more specifically, has a circular section.

Preferably, the outer diameter of the body 24c of the brake 24 is smaller than the inner diameter of the casing 17 of the electromechanical actuator 11, such that the body 24c of the brake 24 can be inserted into the casing 17 of the electromechanical actuator 11, during the assembly of the electromechanical actuator 11.

Advantageously, the body 31c of the interface element 31, the first and second sections 301, 302 of the housing 30 of the electronic control unit 15, the body 16c of the electric motor 16, the body 19c of the reduction gear 19 and, optionally, the body 24c of the brake 24 are assembled to one another using fastening elements 50a, 50b, 50c, 50d, 51a, 51b, in particular by resilient snapping, so as to form the assembly 27.

Thus, the fastening elements 50a, 50b, 50c, 50d, 51a, 51b of the various members 31, 15, 16, 19, 24 of the assembly 27 make it possible to secure these members 31, 15, 16, 19, 24 to one another in rotation and in translation.

In this way, following the fastening of the members 31, 15, 16, 19, 24 of the assembly 27 relative to one another, the links between these members 31, 15, 16, 19, 24 of the assembly 27 have no axial travel, outside the assembly tolerances of the members 31, 15, 16, 19, 24 relative to one another.

Furthermore, the assembly of the various members 31, 15, 16, 19, 24 of the assembly 27 using fastening elements 50a, 50b, 50c, 50d, 51a, 51b makes it possible to introduce, in a single operation, the assembly 27 into the casing 17, following a translational movement.

Here, the fastening elements 50a, 50b, 50c, 50d, 51a, 51b by resilient snapping are made using tongues and slugs.

Here, one of the members of the assembly 27 is assembled to another of the members of the assembly 27 using fastening elements 50a, 50b, 50c, 50d, 51a, 51b by resilient snapping, these snapping elements 50a, 50b, 50c, 50d, 51a, 51b can be four in number and angularly offset by an angle of 90° about the axis of rotation X.

The number and the angular position of the fastening elements by resilient snapping between two of the members of the assembly are not limiting and can be different, in particular, these fastening elements can be three in number and angularly offset by an angle of 120° about the axis of rotation.

Preferably, the outer diameter, respectively, of the body 31c of the interface element 31, the housing 30 of the electronic control unit 15, the body 16c of the electric motor 16, the body 19c of the reduction gear 19 and the body 24c of the brake 24 have a same value.

Advantageously, the electromechanical actuator 11 also comprises a retaining element 32. The retaining element 32 is assembled at the first end 17a of the casing 17. The retaining element 32 comprises a first stop 33 configured to cooperate with the assembly 27 and, more specifically, with the reduction gear 19, in the assembled configuration of the electromechanical actuator 11.

Figure 9:
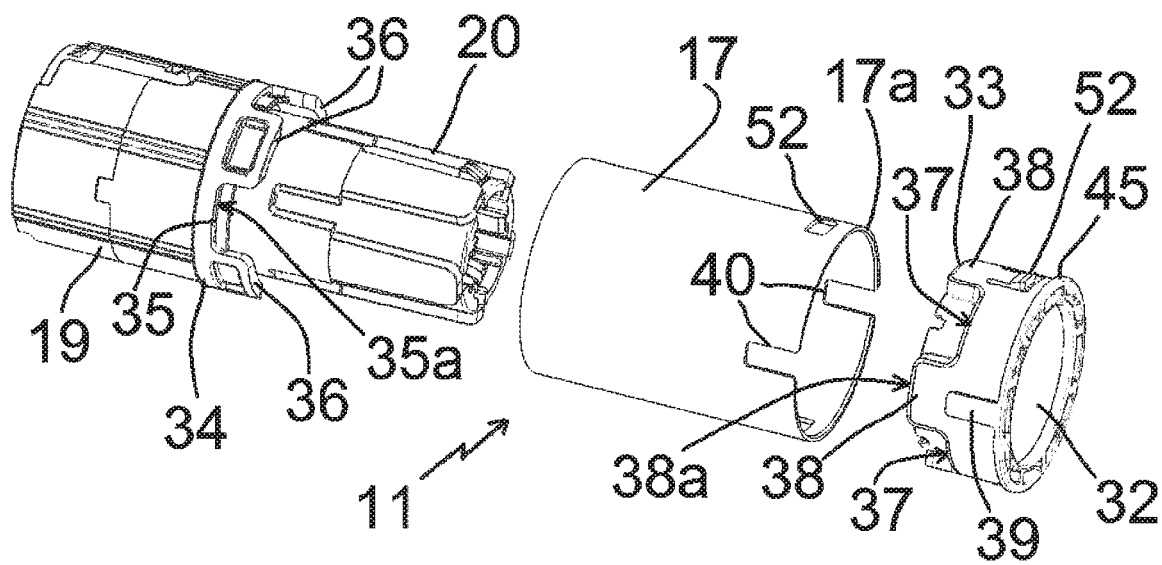
FIG. 9 is an exploded and perspective schematic view of part of the electromechanical actuator illustrated in FIGS. 4 and 5, showing part of a casing of the electromechanical actuator, a reduction gear, an output shaft, an endpiece and a retaining element.
Figure 10:
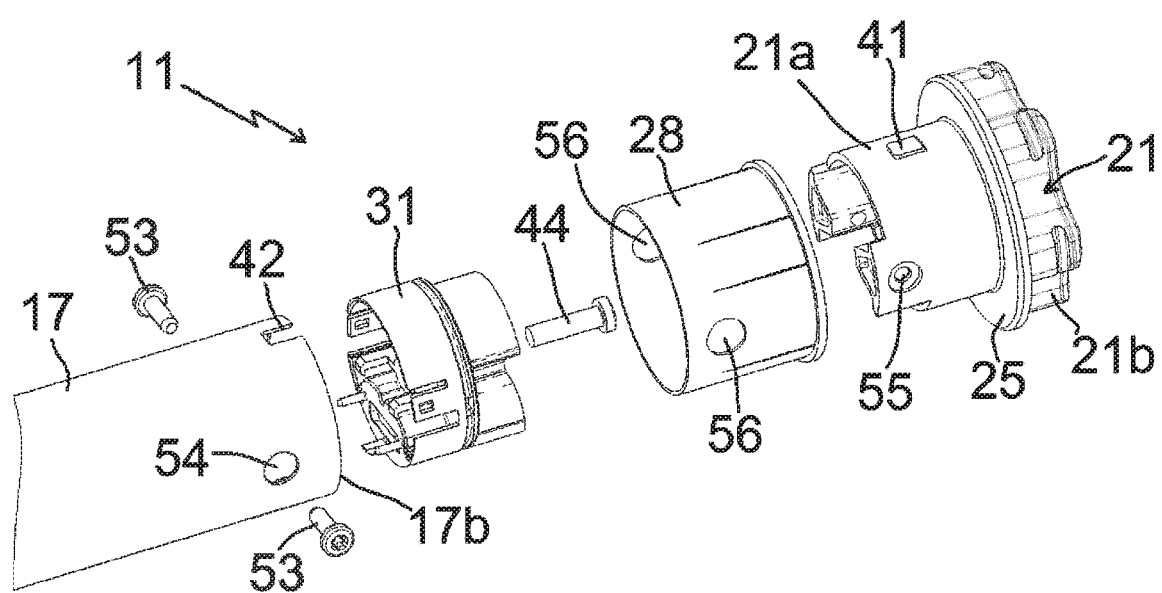
FIG. 10 is an exploded and perspective schematic view of part of the electromechanical actuator illustrated in FIGS. 4 and 5, showing part of the casing of the electromechanical actuator, a crown, the closure element, the interface element and the inhibiting element.

In the exemplary embodiment illustrated in FIGS. 4, 5, 9 and 11, the assembly 27 and, more specifically, the reduction gear 19 comprises an endpiece 34 configured to cooperate with the retaining element 32, at the first end 17a of the casing 17, in the assembled configuration of the electromechanical actuator 11. In FIG. 9, only part of the casing 17 is shown, near its end 17a.

Here, the endpiece 34 comprises notches 35 and tongues 36, positioned alternating around the axis of rotation X, configured to cooperate, respectively, with tongues 38 and notches 37 of the retaining element 32.

Thus, the tongues 38 of the retaining element 32 are configured to engage in the notches 35 of the endpiece 34, in the assembled configuration of the electromechanical actuator 11. Furthermore, the tongues 36 of the endpiece 34 are configured to engage in the notches 37 of the retaining element 32, in the assembled configuration of the electromechanical actuator 11.

In such a case, the first stop 33 of the retaining element 32 configured to cooperate with the assembly 27 and, more specifically, with the reduction gear 19, in the assembled configuration of the electromechanical actuator 11, is produced by an end wall 38a of each of the tongues 38, these end walls 38a bearing against the bottom walls 35a of each of the notches 35 of the endpiece 34.

Here, the endpiece 34 comprises four notches 35 that are angularly offset by an angle of 90°, around the axis of rotation X, and four tongues 36 that are angularly offset by an angle of 90°, around the axis of rotation X. Furthermore, the retaining element 32 comprises four notches 37 that are angularly offset by an angle of 90°, around the axis of rotation X, and four tongues 38 that are angularly offset by an angle of 90°, around the axis of rotation X.

The number and the angular position of the notches and tongues of the endpiece and of the retaining element are not limiting and can be different, in particular, these notches and tongues can be three in number and angularly offset by an angle of 120° about the axis of rotation.

Furthermore, the retaining element 32 comprises indentations 39, each in the form of a radial protrusion, configured to cooperate with first recesses 40 of the casing 17. The first recesses 40 are arranged at the first end 17a of the casing 17.

Here, the retaining element 32 comprises two diametrically opposite indentations 39 relative to the axis of rotation X. Furthermore, the casing 17 comprises two first recesses 40 that are diametrically opposite relative to the axis of rotation X.

In this way, such an assembly of the endpiece 34, the retaining element 32 and the casing 17 makes it possible to block the rotation of the assembly 27 relative to the casing 17 and, more specifically, the reduction gear 19 relative to the casing 17.

Advantageously, the retaining element 32 comprises a second stop 45 configured to cooperate with the casing 17, at the first end 17a of the casing 17, in the assembled configuration of the electromechanical actuator 11.

Thus, the second stop 45 of the retaining element 32 makes it possible to limit the pushing in of the retaining element 32 in the casing 17.

Here, the second stop 45 of the retaining element 32 is made in the form of a flange ring, in particular with a cylindrical and planar shape, perpendicular to the axis of rotation X, in the assembled configuration of the electromechanical actuator 11.

Furthermore, the retaining element 32 and the casing 17 are also assembled to one another using fastening elements 52, in particular by resilient snapping.

Thus, the assembly of the retaining element 32 with the casing 17 makes it possible to block the translation of the retaining element 32 and, more specifically, the assembly 27 relative to the casing 17 and, more specifically, relative to the first end 17a of the casing 17.

In this way, following the fastening of the retaining element 32 with respect to the casing 17, the retaining element 32 serves as a stop for the assembly 27, during the sliding of the assembly 27 inside the casing 17, along the axial direction of the electromechanical actuator 11, from the second end 17b of the casing 17 toward the first end 17a of the casing 17.

Furthermore, the closure element 21 and, more specifically, the first part 21a of the closure element 21 comprises indentations 41, each in the form of a radial protrusion, configured to cooperate with second recesses 42 of the casing 17. The second recesses 42 are arranged at the second end 17b of the casing 17.

Here, the first part 21a of the closure element 21 comprises two diametrically opposite indentations 41 relative to the axis of rotation X. Furthermore, the casing 17 comprises two second recesses 42 that are diametrically opposite relative to the axis of rotation X.

In this way, such an assembly of the closure element 21 and the casing 17 makes it possible to block the rotation of the closure element 21 relative to the casing 17.

Furthermore, the closure element 21 and the casing 17 are also assembled to one another using fastening elements 53, in particular by screwing.

In this way, the assembly of the closure element 21 with the casing 17 makes it possible to block the translation of the closure element 21 relative to the casing 17 and, more specifically, relative to the second end 17b of the casing 17.

Here, the fastening of the closure element 21 with the casing 17 is carried out using fastening screws 53, which may, for example, be of the self-tapping type. In the assembled configuration of the electromechanical actuator 11, the fastening screws 53 pass through passage holes 54 arranged in the casing 17 and are screwed in fastening holes 55 of the closure element 21. Furthermore, the fastening screws 53 pass through passage holes 56 arranged in the crown 28.

In a variant, not shown, the fastening elements of the closure element 21 with the casing 17 can be rivets or fastening elements by resilient snapping.

Such an assembly of the electromechanical actuator 11 makes it possible to provide play J, in particular axial, between the closure element 21 and the interface element 31, along the axial direction of the electromechanical actuator 11, as illustrated in FIGS. 5 and 6.

The play J makes it possible to guarantee the assembly of the closure element 21 relative to the casing 17.

Here and non-limitingly, the play J between the closure element 21 and the interface element 31, along the axial direction of the electromechanical actuator 11, can be of the order of plus or minus two millimeters.

Advantageously, the interface element 31 comprises a first accommodation 43 inside which an inhibiting element 44 is positioned inhibiting the play J between the closure element 21 and the interface element 31, along the axial direction of the electromechanical actuator 11.

Thus, the inhibiting element 44 of the play J between the closure element 21 and the interface element 31, along the axial direction of the electromechanical actuator 11, makes it possible to improve the holding of the members 31, 15, 16, 19, 24, 20 of the electromechanical actuator 11 that are positioned inside the casing 17 and to eliminate the risk of electrical disconnection of the electronic control unit 15 with respect to the electrical power cable 18 and with respect to the electric motor 16, in particular upon impact of the electromechanical actuator 11, which may occur during a manipulation or the transport of the electromechanical actuator 11, or during abnormal operation of the electromechanical actuator 11.

In this way, such a construction of the electromechanical actuator 11 makes it possible to inhibit the play J between the closure element 21 and the interface element 31, along the axial direction of the electromechanical actuator 11, following the assembly of the electromechanical actuator 11, so as to guarantee a functional state of the electromechanical actuator 11, during different phases in the lifetime of the electromechanical actuator 11.

Furthermore, the inhibiting element 44 makes it possible to block the translation of the interface element 31 relative to the closure element 21.

Here, the first accommodation 43 of the interface element 31 has a generally cylindrical shape, centered on a longitudinal axis X31 of the interface element 31.

Furthermore, the longitudinal axis X31 of the interface element 31 is combined with the rotation axis X of the electric motor 16 of the electromechanical actuator 11, or the rotation axis of the winding tube 4, in the mounted configuration of the motorized driving device 5.

Preferably, the closure element 21 comprises a first accommodation 26 emerging at a first face 21c of the closure element 21 and at a second face 21d of the closure element 21.

The first accommodation 26 of the closure element 21 is positioned opposite the inhibiting element 44, in the assembled configuration of the electromechanical actuator 11, so as to allow a position adjustment of the inhibiting element 44 from the outside of the closure element 21.

Thus, the position adjustment of the inhibiting element 44 with respect to the interface element 31 and the closure element 21, along the axial direction of the electromechanical actuator 11, can be carried out from the outside of the closure element 21 and, more specifically, of the electromechanical actuator 11, by maneuvering the inhibiting element 44 using a tool, not shown, such as a screwdriver, that passes through the first accommodation 26 of the closure element 21, as explained hereinafter.

In this way, the positioning of the inhibiting element 44 relative to the interface element 31 and the closure element 21, along the axial direction of the electromechanical actuator 11, can be carried out as a function of the value of the play J, without having to disassemble one or several elements of the electromechanical actuator 11.

Here, the first accommodation 26 of the closure element 21 has a generally cylindrical shape, centered on a longitudinal axis X21 of the closure element 21.

Furthermore, the longitudinal axis X21 of the closure element 21 is combined with the rotation axis X of the electric motor 16 of the electromechanical actuator 11, or the rotation axis of the winding tube 4, in the mounted configuration of the motorized driving device 5. Furthermore, the longitudinal axis X21 of the closure element 21 is combined with the longitudinal axis X31 of the interface element 31, in the assembled configuration of the electromechanical actuator 11.

Advantageously, the inhibiting element 44 is configured to cooperate with a face of the closure element 21 and, more specifically, the second face 21d of the closure element 21, following a position adjustment of the inhibiting element 44 relative to the closure element 21, along the axial direction of the electromechanical actuator 11, so as to inhibit the play J between the closure element 21 and the interface element 31.

Thus, the inhibition of the play J between the closure element 21 and the interface element 31 is implemented by the position adjustment of the inhibiting element 44 relative to the interface element 31 and the closure element 21, along the axial direction of the electromechanical actuator 11 and, more specifically, the bearing of the inhibiting element 44 against the second face 21d of the closure element 21.

Preferably, the inhibiting element 44 is a screw. Furthermore, the first accommodation 43 of the interface element 31 is a bore.

Here, the inhibiting element 44 is a screw having a metric thread. Furthermore, the first accommodation 43 of the interface element 31 is a tapped bore.

In a variant, not shown, the inhibiting element 44 is a self-tapping screw. In this case, the first accommodation 43 of the interface element 31 is a smooth bore.

In one exemplary embodiment, the screw forming the inhibiting element 44 is a screw identical to the screws forming the fastening elements 53 of the closure element 21 with the casing 17.

Thus, the number of screw models for manufacturing the electromechanical actuator 11 is limited, so as to simplify industrialization and avoid reference error risks.

In practice, a head of the screw forming the inhibiting element 44 is configured to cooperate with the second face 21d of the closure element 21, following unscrewing of the screw 44 relative to the bore 43 of the interface element 31, so as to inhibit the play J between the closure element 21 and the interface element 31.

Advantageously, the first accommodation 26 arranged in the closure element 21 allows the passage of a tool, in particular a screwdriver, so as to reach the inhibiting element 44 and, more specifically, to allow the unscrewing of the screw forming the inhibiting element 44.

Preferably, the inhibiting element 44 is assembled on the interface element 31 before the assembly 27 is introduced inside the casing 17.

Thus, the operation to assemble the inhibiting element 44 on the interface element 31 does not cause an extension of the time to assemble the assembly 27 inside the casing 17, since this operation can be carried out during hidden time, during the manufacturing of the electromechanical actuator 11.

Here, the screw 44 is screwed to the inside of the first accommodation 43 of the interface element 31 before the assembly 27 is introduced inside the casing 17, in particular until the head of the screw 44 is made to bear against the rim of the first accommodation 43 of the interface element 31.

Advantageously, the closure element 21 comprises a second accommodation 46. The second accommodation 46 of the closure element 21 is configured to allow the passage of the electrical power cable 18.

Furthermore, the interface element 31 comprises a second accommodation 47. The second accommodation 47 of the interface element 31 comprises part of the first electrical connector 48. The first electrical connector 48 arranged in the second accommodation 47 of the interface element 31 is configured to cooperate with an electrical connector of the electrical power cable 18.

Furthermore, the first electrical connector 48 of the interface element 31 is electrically coupled to the electronic control unit 15, using electrical connection elements, in particular using electrical pins, not shown, configured to cooperate with tracks of the electronic board 29 of the electronic control unit 15.

Thus, the electrical connector of the electrical power cable 18 is configured to cooperate with the first electrical connector 48 of the interface element 31, so as to supply electrical energy to the electric motor 16, using the electrical power cable 18.

In one exemplary embodiment, not shown, the second accommodation 46 of the closure element 21 is also configured to allow the passage of a data exchange cable.

In this case, the interface element 31 comprises a third accommodation. The third accommodation of the interface element 31 comprises a second electrical connector. The second electrical connector arranged in the third accommodation of the interface element 31 is configured to cooperate with an electrical connector of the data exchange cable.

Furthermore, still in this case, the second electrical connector of the interface element 31 is electrically coupled to the electronic control unit 15, using electrical connection elements, in particular using electrical pins, not shown, configured to cooperate with tracks of the electronic board 29 of the electronic control unit 15.

In such a case where the electromechanical actuator 11 is coupled to the data exchange cable, the latter allows the electronic control unit 15 to receive and/or send data with a control unit, in particular with the local control unit 12 and/or the central control unit 13, via a wired link.

Thus, the electrical connector of the data exchange cable is configured to cooperate with the second electrical connector of the interface element 31, so as to exchange data between at least one of the control units 12, 13 and the electronic control unit 15.

Owing to the present invention, obtaining the housing using first and second sections, made in the form of a hollow tube, makes it possible to adapt the length of the housing as a function of the length of the electronic board, using at least one of the first and second sections, while eliminating manufacturing flaws, in particular in the case where the housing is made using a single section, made in the form of a hollow tube.

Furthermore, obtaining the housing using first and second sections, made in the form of a hollow tube, makes it possible to guarantee the protection of the electronic board, during the assembly of the electronic control unit to the inside of the casing of the electromechanical actuator, in particular to avoid a deformation of the electronic board.

Many changes can be made to the example embodiment previously described without going beyond the scope of the invention.

In a variant, not shown, the housing of the electronic control unit comprises a number of sections, made in the form of a hollow tube, greater than or equal to three.

Furthermore, the considered embodiments and variants may be combined to generate new embodiments of the invention, without going beyond the scope of the invention.

The invention claimed is:

1. A tubular electromechanical actuator for a closure or sun protection home-automation installation, the electromechanical actuator comprising at least:
   an electronic control unit, the electronic control unit comprising a housing and an electronic board, the electronic board being arranged inside the housing, in an assembled configuration of the electronic control unit, an electric motor,
a reduction gear,
an output shaft,
a casing, the casing being hollow and configured to house at least the electronic control unit, the electric motor and the reduction gear, and
a closure and torque-reacting head, the closure and torque-reacting head closing off an end of the casing, wherein:
the housing of the electronic control unit is made of two parts distinct from the closure and torque-reacting head,
the housing of the electronic control unit comprises at least a first section, having a form of a hollow tube, and a second section, having a form of a hollow tube, the first and second sections enclosing the electronic board, in the assembled configuration of the electronic control unit,
the first section of the housing comprises first fastening elements cooperating with first fastening elements of the second section of the housing, in the assembled configuration of the electronic control unit,
the first and second sections of the housing are modular and invertable, and
the first and second sections of the housing have an identical shape and an identical or different length.

2. The tubular electromechanical actuator for a closure or sun protection home-automation installation according to claim 1, wherein the first fastening elements are fastening elements configured to fasten by resilient snapping.

3. The tubular electromechanical actuator for a closure or sun protection home-automation installation according to claim 2, wherein the first section of the housing comprises second fastening elements cooperating with first fastening elements of the electric motor, in an assembled configuration of the electromechanical actuator.

4. The tubular electromechanical actuator for a closure or sun protection home-automation installation according to claim 2, wherein the electric motor comprises an electric connector cooperating with the electronic board of the electronic control unit, in an assembled configuration of the electromechanical actuator.

5. The tubular electromechanical actuator for a closure or sun protection home-automation installation according to claim 2, wherein the electromechanical actuator also comprises an interface element, the interface element being positioned between the closure element and the electronic control unit, and wherein the second section of the housing comprises second fastening elements cooperating with first fastening elements of the interface element, in an assembled configuration of the electromechanical actuator.

6. The tubular electromechanical actuator for a closure or sun protection home-automation installation according to claim 2, wherein the first and second sections of the housing are made from a plastic material and the first and second sections of the housing are made of injected plastic material.

7. The tubular electromechanical actuator for a closure or sun protection home-automation installation according to claim 1, wherein the first section of the housing comprises second fastening elements cooperating with first fastening elements of the electric motor, in an assembled configuration of the electromechanical actuator.

8. The tubular electromechanical actuator for a closure or sun protection home-automation installation according to claim 7, wherein the electric motor comprises an electric connector cooperating with the electronic board of the electronic control unit, in an assembled configuration of the electromechanical actuator.

9. The tubular electromechanical actuator for a closure or sun protection home-automation installation according to claim 7, wherein the electromechanical actuator also comprises an interface element, the interface element being positioned between the closure element and the electronic control unit, and wherein the second section of the housing comprises second fastening elements cooperating with first fastening elements of the interface element, in an assembled configuration of the electromechanical actuator.

10. The tubular electromechanical actuator for a closure or sun protection home-automation installation according to claim 7, wherein the first and second sections of the housing are made from a plastic material and the first and second sections of the housing are made of injected plastic material.

11. The tubular electromechanical actuator for a closure or sun protection home-automation installation according to claim 1, wherein the electric motor comprises an electric connector cooperating with the electronic board of the electronic control unit, in an assembled configuration of the electromechanical actuator.

12. The tubular electromechanical actuator for a closure or sun protection home-automation installation according to claim 11, wherein the electromechanical actuator also comprises an interface element, the interface element being positioned between the closure element and the electronic control unit, and wherein the second section of the housing comprises second fastening elements cooperating with first fastening elements of the interface element, in an assembled configuration of the electromechanical actuator.

13. The tubular electromechanical actuator for a closure or sun protection home-automation installation according to claim 11, wherein the first and second sections of the housing are made from a plastic material and the first and second sections of the housing are made of injected plastic material.

14. The tubular electromechanical actuator for a closure or sun protection home-automation installation according to claim 1, wherein the electromechanical actuator also comprises an interface element, the interface element being positioned between the closure element and the electronic control unit, and wherein the second section of the housing comprises second fastening elements cooperating with first fastening elements of the interface element, in an assembled configuration of the electromechanical actuator.

15. The tubular electromechanical actuator for a closure or sun protection home-automation installation according to claim 14, wherein the first section of the housing comprises second fastening elements cooperating with first fastening elements of the electric motor in an assembled configuration of the electromechanical actuator, and wherein the first and second fastening elements of the first section are respectively identical to the first and second fastening elements of the second section.

16. The tubular electromechanical actuator for a closure or sun protection home-automation installation according to claim 14, wherein the interface element comprises an electric connector cooperating with the electronic board of the electronic control unit, in the assembled configuration of the electromechanical actuator.

17. The tubular electromechanical actuator for a closure or sun protection home-automation installation according to claim 14, wherein the first and second sections of the housing are made from a plastic material and the first and second sections of the housing are made of injected plastic material.

18. The tubular electromechanical actuator for a closure or sun protection home-automation installation according to claim 1, wherein the first and second sections of the housing are made from a plastic material and the first and second sections of the housing are made of injected plastic material.

19. The tubular electromechanical actuator for a closure or sun protection home-automation installation according to claim 1, wherein each of the first and second sections of the housing comprises a first groove and a second groove that keep the electronic board in position inside the housing, in the assembled configuration of the electronic control unit.

20. A home-automation installation for closing or providing sun protection that comprises a screen able to be wound on a winding tube rotated by a tubular electromechanical actuator, said installation further comprising the tubular electromechanical actuator according to claim 1.

21. A tubular electromechanical actuator for a closure or sun protection home-automation installation, the electromechanical actuator comprising at least:
   an electronic control unit, the electronic control unit comprising a housing and an electronic board, the electronic board being arranged inside the housing, in an assembled configuration of the electronic control unit,
   an electric motor,
   a reduction gear,
   an output shaft,
   a casing, the casing being hollow and configured to house at least the electronic control unit, the electric motor and the reduction gear, and
   a closure and torque-reacting head, the closure and torque-reacting head closing off an end of the casing,
   wherein,
   the housing of the electronic control unit is made of two parts distinct from the closure and torque-reacting head,
   the housing of the electronic control unit comprises at least a first section, having a form of a hollow tube with a cylindrical shape with a circular section, and a second section, having a form of a hollow tube with a cylindrical shape with a circular section, the first and second sections enclosing the electronic board, in the assembled configuration of the electronic control unit,
   the first section of the housing comprises first fastening elements cooperating with first fastening elements of the second section of the housing, in the assembled configuration of the electronic control unit,
   the first and second sections of the housing are modular and invertable, and
   the first and second sections of the housing have an identical shape and an identical or different length.

* * * * *